(12) United States Patent
Vogt et al.

(10) Patent No.: US 11,549,234 B2
(45) Date of Patent: Jan. 10, 2023

(54) CONSTRUCTION MACHINE HAVING A DEVICE FOR CONTROLLING THE CONSTRUCTION MACHINE AND METHOD FOR CONTROLLING A CONSTRUCTION MACHINE

(71) Applicant: Wirtgen GmbH, Windhagen (DE)

(72) Inventors: Andreas Vogt, Asbach (DE); Sebastian Winkels, Windeck (DE); Christian Berning, Zülpich (DE); Tim Liesenfeld, Neuwied ST Heimbach-Weis (DE)

(73) Assignee: Wirtgen GmbH

( * ) Notice: Subject to any disclaimer, the term of this patent is extended or adjusted under 35 U.S.C. 154(b) by 369 days.

(21) Appl. No.: 16/823,926

(22) Filed: Mar. 19, 2020

(65) Prior Publication Data
US 2020/0308807 A1 Oct. 1, 2020

(30) Foreign Application Priority Data
Mar. 26, 2019 (DE) ...................... 10 2019 107 800.8

(51) Int. Cl.
*E02F 9/20* (2006.01)
*E02F 9/26* (2006.01)
(Continued)

(52) U.S. Cl.
CPC ............ *E02F 9/2025* (2013.01); *E02F 9/267* (2013.01); *G06F 3/0416* (2013.01);
(Continued)

(58) Field of Classification Search
None
See application file for complete search history.

(56) References Cited

U.S. PATENT DOCUMENTS 8,112,189 B2 † 2/2012 Peltz
8,515,642 B2 8/2013 Irsigler et al.
(Continued)

FOREIGN PATENT DOCUMENTS

CN 101687499 A 3/2010
CN 104350214 A 2/2015
(Continued)

OTHER PUBLICATIONS

A. Söderberg et al., "Safety-related Machine Control using standard EN ISO 13849-1," pp. 1-98, 2018, RISE Research Institutes of Sweden AB Boras. (Year: 2018).*
(Continued)

*Primary Examiner* — Saad Khawar
(74) *Attorney, Agent, or Firm* — Gary L. Montle; Lucian Wayne Beavers; Patterson Intellectual Property Law, PC

(57) ABSTRACT

A construction machine is provided with a control device having an operating panel with operating elements, which can assume numerous switching states/positions, a control and monitoring unit for controlling machine components via control signals signalling the switching state/position of associated operating elements, and a display/signal unit interacting with the control and monitoring unit. The control device provides first and second signal transmission paths for transmitting a first control signal signalling the switching state/position of a first operating element and a second control signal signalling the switching state/position of a second operating element, respectively. The control signals are checked for the existence of a plausibility criterion. If the plausibility criterion is not met, signal transmission over one or the other signal transmission path is deactivated, wherein the functionality of the relevant component is checked. Switching to emergency operation is only possible after confirmation of the functionality of the relevant component.

25 Claims, 6 Drawing Sheets

(51) Int. Cl.
  *G06F 3/041* (2006.01)
  *H04L 12/403* (2006.01)
  *H04L 12/40* (2006.01)

(52) U.S. Cl.
  CPC ...... *H04L 12/403* (2013.01); *H04L 12/40013* (2013.01); *H04L 2012/40215* (2013.01); *H04L 2012/40273* (2013.01)

(56) References Cited

U.S. PATENT DOCUMENTS 9,645,555 B2    5/2017  Dold
9,926,686 B2 †  3/2018  Kishimoto

FOREIGN PATENT DOCUMENTS

| DE | 102009052998 | A1 |   | 4/2011 |           |
|----|--------------|----|---|--------|-----------|
| DE | 102012009000 | A1 | * | 11/2013 | E02F 9/2025 |
| DE | 102012009000 | A1 |   | 11/2013 |           |
| DE | 102012009000.5 | A1 | † | 1/2014 |           |
| EP | 2720094 | A1 |   | 4/2014 |           |
| EP | 2844804 | A1 |   | 3/2015 |           |
| WO | 2005003869 | A1 |   | 1/2005 |           |

OTHER PUBLICATIONS

China Office Action for corresponding patent application No. CN 202010210785.0, dated Jun. 24, 2021, 5 pages (not prior art).
European Search Report for corresponding patent application 20156859.9, dated Aug. 7, 2020, 9 pages (not prior art).
A. Soderberg et al., "Safety-related Machine Control using standard EN ISO 13849-1," pp. 1-98, 2018, RISE Research Institutes of Sweden AB Boras.†

\* cited by examiner
† cited by third party

CONSTRUCTION MACHINE HAVING A DEVICE FOR CONTROLLING THE CONSTRUCTION MACHINE AND METHOD FOR CONTROLLING A CONSTRUCTION MACHINE

CROSS-REFERENCES TO RELATED APPLICATIONS

This application claims benefit of German Patent Application No. 10 2019 107 800.8, filed Mar. 26, 2019, and which is hereby incorporated by reference.

FIELD OF THE INVENTION

The invention relates to a construction machine having a machine frame which is supported by a chassis and a device for controlling the construction machine. In addition, the invention relates to a method for controlling a construction machine.

BACKGROUND

The known self-propelled construction machines generally have a machine frame which is supported by a chassis having at least two running gears and at least one piece of work equipment arranged on the machine frame. The running gears can have chains or wheels or bandages. Self-propelled construction machines are known which have equipment for working the ground, for example for removing damaged road layers (road milling machine), for preparing the ground for road construction or reprocessing existing road surfaces (stabilisers, recyclers) or for mining mineral resources (surface miner). Lifting devices can generally be assigned to the individual running gears of the construction machine in order to be able to lower and raise the machine frame together with the work equipment relative to the ground surface. A height-adjustable edge protector can be provided on both sides of the milling or cutting roller. The roller housing can be closed on the front side in the working direction by a height-adjustable hold-down element and on the rear side by a height-adjustable scraper.

Examples of construction machines also include the known slipform pavers, road pavers, rollers, crushers, graders, loaders, cranes, etc.

The known construction machines have a variety of components that can perform certain functions. These components include, for example, the lifting devices for height adjustment of the machine frame, the height-adjustable edge protection and the height-adjustable hold-down element or scraper. "Components of a construction machine" are also understood to mean, for example, pumps or headlights that can be switched on or off.

The individual components of the construction machine are controlled by a control and monitoring unit. Operating elements are provided for operating the construction machine, with which the machine operator can influence the individual components. The operating elements can assume a plurality of switching states or positions. For example, by actuating the operating elements, the machine operator can extend and retract the lifting devices and adjust the height of the edge protection, hold-down element or scraper, or switch a pump or a headlight on and off. Piston arrangements/cylinder arrangements, which are controlled by the control and monitoring unit, are generally provided for extending and retracting the lifting devices and for adjusting the height of the edge protection, hold-down element or scraper.

In addition, the known construction machines have a display and/or signal unit which interacts with the control and monitoring unit and on which the individual operating states can be indicated or signalled optically and/or acoustically and/or in a tactile manner.

With increasing automation, the demands on the safety of the construction machine increase. Safe operation of the construction machine requires correct functioning of the different components of the construction machine. If the machine operator actuates an operating element on the operating panel, it must be ensured that the component(s) assigned to the operating element function(s) correctly. In the event of a safety-relevant malfunction, the operation of the construction machine should be interrupted.

WO 2005/003869 A1 describes a device and a method for the automated control of an operating sequence of a technical system. The device comprises two control units. One control unit generates control commands that are designed to control the system, and the other control unit generates control commands that are designed to perform safety functions.

A controller for a construction machine is known from EP 2 844 804 B1, which has an operating panel having operating elements and a control and monitoring unit for controlling actuators of the construction machine. The device comprises a display unit which can take over the function of the operating panel in the event of a malfunction.

BRIEF SUMMARY

An object of the invention is to improve the control of a construction machine taking into account the respective safety requirements.

This object is achieved with the features of the independent claims. The dependent claims relate to advantageous embodiments of the invention.

The device for controlling the construction machine according to the invention provides at least two signal transmission paths for signal transmission between the at least one operating element and the control and monitoring unit. In this sense, a first and a second signal transmission path should not be understood to mean that the device for controlling the construction machine according to the invention has only two signal transmission paths. Signal transmission paths are understood to mean all the means for transmitting the signals between the operating element and the control and monitoring unit. The operating elements can be mechanical and/or electronic operating elements, which can assume two switching states, for example an on/off switch, or a plurality of switching states, for example step switches, or different positions, for example controllers. The operating elements of the operating panel can be, for example, toggle switches, rocker switches, rotary switches, potentiometers, etc.

A first control signal signalling the switching state or the position of the at least one operating element is transmitted via the first signal transmission path and a second control signal signalling the switching state or position of the at least one operating element is transmitted via the second signal transmission path. Since only one signal path is normally required in trouble-free operation, redundancy is thus created. It can be assumed, however, that the signal transmission via one of the two signal paths alone already meets high safety requirements due to existing safety measures. The control signals can be digital signals and/or analogue signals. Two switching states are sufficient to switch a component of the construction machine on and off with the operating element, for example to switch a pump on and off or to retract or extend and stop a piston unit/cylinder unit. The position of the operating element can be used to set a specific position of the component, for example the stroke position of a lifting device The control and monitoring unit is configured such that the first control signal transmitted via the first signal transmission path and the second control signal transmitted via the second signal transmission path are checked for the existence of a plausibility criterion, wherein the control and monitoring unit causes the display and/or signal unit to issue a request to actuate the operating element if the control signals transmitted via the first and second signal transmission paths do not meet the plausibility criterion.

For the machine operator, the request to activate emergency operation is initially to be understood as an indication of a faulty condition. Since the signal transmission via one of the two signal paths can already meet high safety requirements by virtue of suitable safety devices, the controller according to the invention provides emergency operation, particularly in the case of less safety-relevant components. The basic principle of the invention is that a switchover to emergency operation cannot take place without a prior functional check of the relevant component by the machine operator. The control and monitoring unit therefore causes the display and/or signal unit to issue a request to activate an emergency operation. This request to the machine operator can be made by outputting an acoustic and/or optical and/or tactile signal and/or by displaying a graphical representation, for example one or more symbols, or by displaying a text, etc. The display and/or signal unit can be designed differently for this purpose.

A preferred embodiment of the device according to the invention provides an input unit which interacts with the control and monitoring unit and is designed in such a way that the machine operator or another person can confirm that the component in question is functioning correctly, wherein a control signal signalling the correct functioning of the component is generated, which the control and monitoring unit receives, or an incorrect functioning of the component can be confirmed, wherein a control signal signalling the incorrect functioning of the component is generated, which the control and monitoring unit receives. The machine operator or another person is therefore asked to check the functionality of the component of the construction machine. If this component does not work, emergency operation is not possible.

The control and monitoring unit is configured such that in the event that the control signals transmitted via the first and second signal transmission paths do not meet the plausibility criterion, the controller is switched to an operating state in which the second signal transmission path is deactivated, so that the control of the component of the construction machine takes place only as a function of the first control signal transmitted via the first signal transmission path.

"Deactivating a signal transmission path" is understood to mean all the measures which allow control of the component of the construction machine without the plausibility check as a function of only one control signal which is transmitted via one of the two signal transmission paths. The signal transmission path can be deactivated by an interruption in the transmission path or an interruption in the data transmission over the path. The evaluation of the relevant signals can also be interrupted.

After the second signal transmission path has been deactivated, the control and monitoring unit causes the display and/or signal unit to issue a request to the machine operator or another person to actuate the operating element, wherein in the event that the control and monitoring unit receives the control signal signalling the correct functioning of the component after the actuation of the operating element, i.e. if the machine operator or another person has confirmed the correct functioning of the component, the controller is switched to an emergency operation in which the control of the component without the plausibility check takes place only as a function of the first control signal transmitted via the first signal transmission path.

In the event that the control and monitoring unit receives the control signal signalling the incorrect functioning of the component after actuation of the operating element, i.e. if the machine operator or another person has not confirmed the functionality of the component or has confirmed the incorrect functioning, the control is switched to an operating state in which the first signal transmission path is deactivated, such that the control of the component takes place only as a function of the second control signal transmitted via the second signal transmission path. The control and monitoring unit now causes the display and/or signal unit again to issue a request to actuate the operating element.

In the event that the control and monitoring unit receives the control signal signalling the correct functioning of the component after the renewed actuation of the operating element, the controller is switched to an emergency operation in which the control of the component without a plausibility check takes place only as a function of the second control signal transmitted via the second signal transmission path.

In emergency operation a plausibility check no longer takes place, but the control of the relevant component of the construction machine can take place with the safety devices that can be provided via a signal transmission path, but only if the functionality has been checked and confirmed beforehand, which is sufficient at least in the case of less safety-relevant components.

"Controlling a component of the construction machine" means the actuation of the component, for example height adjustment of the scraper or hold-down element, or the switching on or off of a pump. The component can be actuated by means of an actuator, for example by means of a piston unit/cylinder unit which actuates a lifting device.

A preferred embodiment provides that in the event that the control and monitoring unit receives the control signal signalling the incorrect functioning of the component in the operating state in which the first signal transmission path is deactivated, or in the operating state in which the second signal transmission path is deactivated, the controller is not switched to an emergency operation. In this case, further operation of the construction machine can be prevented. However, the operation of the entire construction machine does not necessarily have to be prevented, but only the operation of the component in question may be prevented.

If the controller is not switched to an emergency operation, the control and monitoring unit can cause the display and/or signal unit to display and/or signal a fault, so that the machine operator is informed that an emergency operation is not possible.

The operating panel having the operating elements for controlling the construction machine and the input unit for confirming the correct functioning of the construction machine can be spatially separate units or can be a common device. For example, the operating panel can be arranged on the driver's station in the vicinity of the machine operator and the input unit can be arranged on the side of the construction machine in the vicinity of another person's workspace. The input unit should be in the vicinity of the person in whose field of vision the component is located, the functionality of which is to be checked.

The display and/or signal unit and the input unit preferably have a touch-sensitive screen (touch screen) having a graphical user interface in order to facilitate operation. Both units can have a common touch-sensitive screen. However, mechanical switches or buttons and a conventional screen can also be provided.

In a further preferred embodiment, the first and/or second signal transmission path are bus lines of a bus system, which allows data transmission between the individual components with little outlay for the cabling. The bus system can be a CAN bus, which offers advantages in terms of high interference immunity, low costs and real-time capability. The signal transmission path can also comprise only part of a bus line.

In the method according to the invention for controlling a component of a construction machine, a first control signal signalling the switching state or the position of an operating element is transmitted via a first signal transmission path and a second control signal signalling the switching state of an operating element is transmitted via a second signal transmission path. The first control signal transmitted via the first signal transmission path and the second control signal transmitted via the second signal transmission path are checked for the existence of a plausibility criterion, wherein a display and/or signal unit is prompted to issue a request to activate an emergency operation if the control signals transmitted via the first and second signal transmission path do not meet the plausibility criterion.

If the plausibility criterion is not met, the signal transmission via one or the other signal transmission path is deactivated, wherein the functionality of the component in question is checked during a signal transmission via the respectively active signal transmission path without the plausibility check. Switching to emergency operation is only possible after confirmation of the correct functioning of the component in question, which presupposes that only one of the two signal transmission paths is disrupted.

BRIEF DESCRIPTION OF THE SEVERAL VIEWS OF THE DRAWINGS

Several embodiments of the invention will be explained in detail with reference to the drawings.

In the drawings.

DETAILED DESCRIPTION

Figure 1:
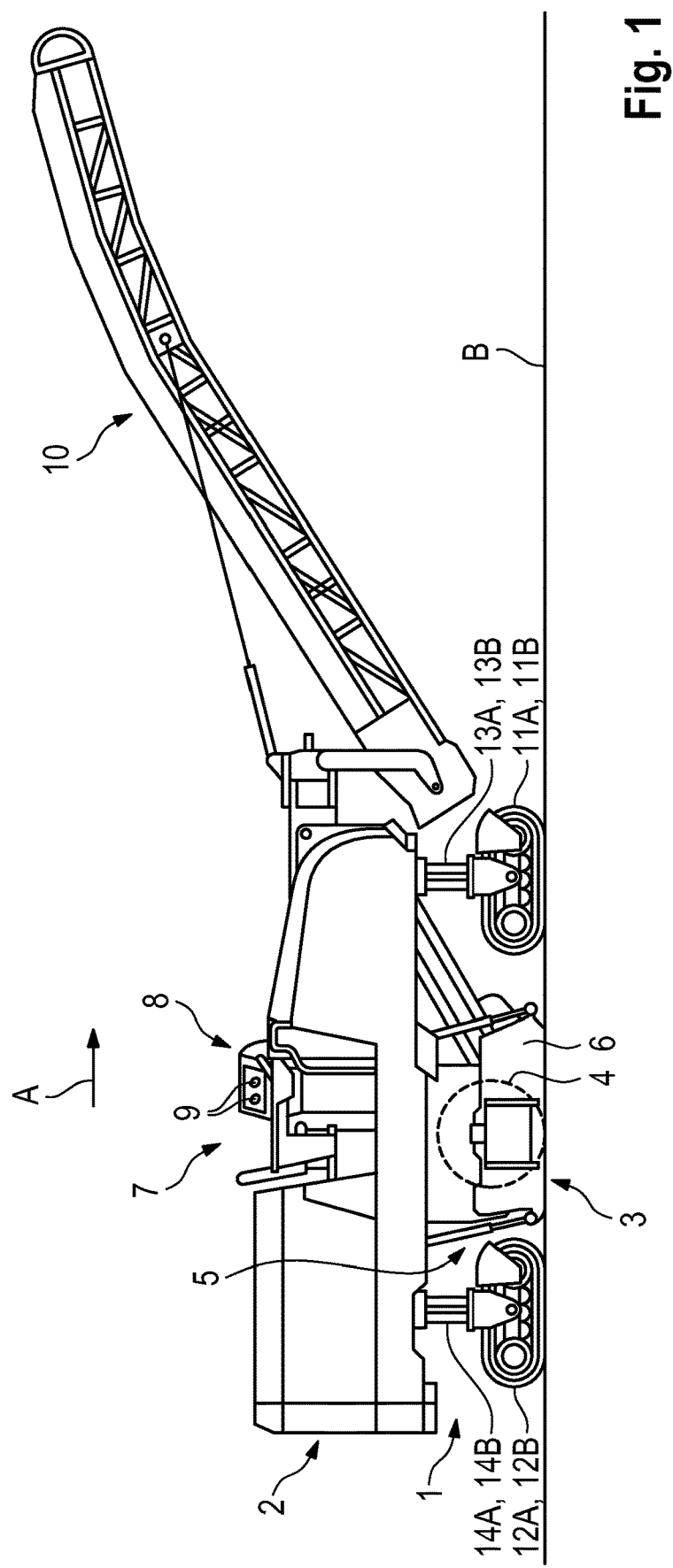
FIG. 1 is a side view of an embodiment of a construction machine.
Figure 2:
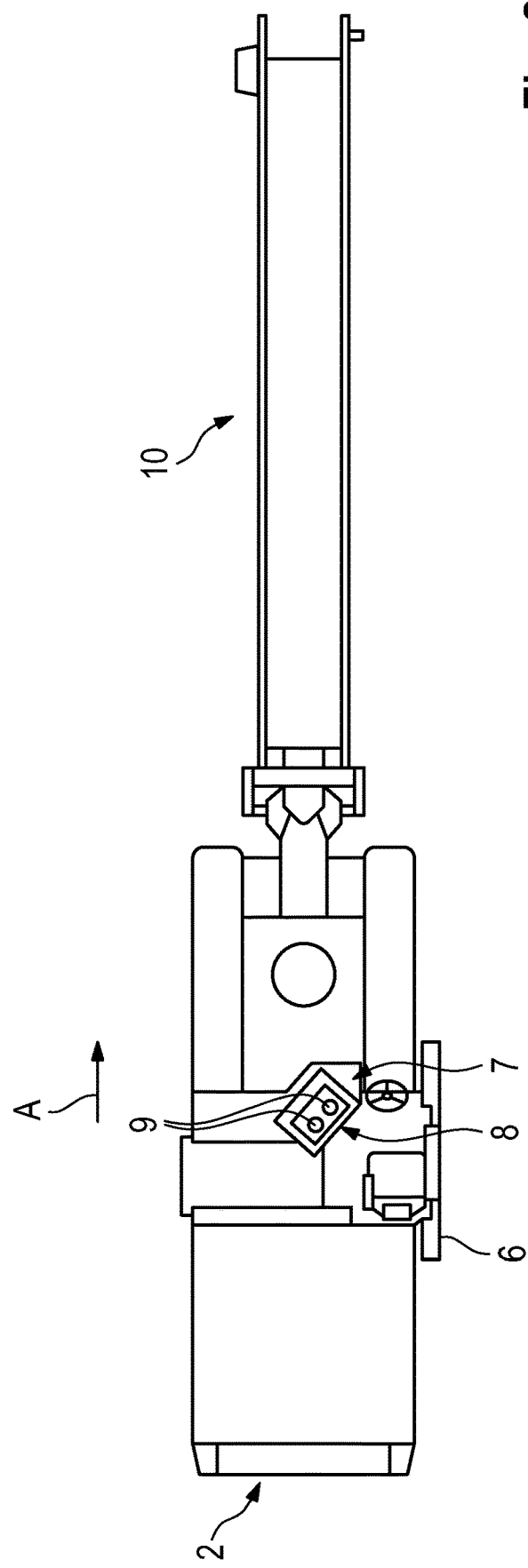
FIG. 2 is a plan view of the construction machine from FIG. 1.

FIGS. 1 and 2 show in side and top views, as an example of a construction machine, a self-propelled road milling machine for milling road surfaces, which is a front loading road milling machine. The construction machine has a machine frame 2 supported by a chassis 1, on which work equipment 3 is arranged. The work equipment 3 has a milling drum 4, which is only hinted at in FIG. 1 and is arranged in a milling drum housing 5. On the left and right side in the working direction A, the milling drum housing 5 is closed by an edge protector 6. On the front side in the working direction A, the milling drum housing 5 is closed by a hold-down element and on the rear side it is closed by a scraper, which cannot be seen in FIG. 1. Above the milling drum housing 5 is the control station 7 on the machine frame having an operating panel 8 for the machine operator. The operating panel 8 has a plurality of operating elements 9, which the machine operator can operate. The milled material is removed by a conveyor 10 which is pivotally arranged on the front of the machine frame 2.

The construction machine has in the working direction A front left running gear 11A and a front right running gear 11B and a rear left running gear 12A and a rear right running gear 12B, to which are assigned a front, left and right lifting device 13 A,B and a rear, left and right lifting device 14 A,B in the working direction A, such that the height and inclination of the machine frame 2 relative to the ground surface B can be changed by retracting or extending the lifting devices.

The retractable and extendable lifting devices 13A, 13B, 14A, and 14B, the pivoting conveyor 10, the height-adjustable edge protection 6, hold-down elements and scrapers are examples of components of the construction machine that are adjusted by actuators. The actuators can be piston/cylinder arrangements with which the relevant components are actuated.

The device for controlling the construction machine is described below with reference to the block diagram of FIG. 3, which shows only the components of the device that are essential to the invention.

The device for controlling the construction machine has a control and monitoring unit 15, which can form a separate unit or can be part of a central computing and control device (not shown) of the construction machine. The control and monitoring unit 15 can comprise analogue or digital circuits. For example, it can have a generic processor, a digital signal processor (DSP) for continuous processing of digital signals, a microprocessor, an application-specific integrated circuit (ASIC), an integrated circuit consisting of logic members (FPGA), or other integrated circuits (IC) or hardware components. A data processing program (software) can be run on the hardware components.

In the present embodiment, the control and monitoring unit 15 is a programmable logic controller (PLC) which comprises an input part, a processing part and an output part (not shown in the block diagram) and takes over the machine control. The control and monitoring unit 15 controls the actuators for actuating the individual components of the construction machine (not shown in FIG. 3), for example a piston unit/cylinder unit for raising or lowering the scraper. Only one of the actuators is shown in FIG. 3. The individual components can also be controlled directly by the control and monitoring unit 15, for example a pump or a headlight can be switched on and off. The programmable logic controller (PLC) can have analogue and/or digital inputs for digital or analogue signals, particularly inputs for signals of a bus system, for example a CAN bus.

In addition, the controller has an operating panel 8, which is arranged on the control station 7 (FIGS. 1 and 2). The operating panel 7 has a plurality of operating elements 9, for example mechanical switches or buttons or controllers. In the present embodiment, an operating element 9 is provided which the machine operator can actuate in order to actuate the scraper, for example to lift the scraper. In the present embodiment, this operating element is a mechanical button 9.

The operating element (button) 9 for lifting the scraper has two switching states, i.e. a switching state in which the piston/cylinder arrangement assigned to the scraper is not actuated, and a switching state in which the piston/cylinder unit is retracted for lifting the scraper. The operating element (button) 9 has a first contact pair 9A and a second contact pair 9B, each of which assume an open or closed switching state. A control signal is generated in the closed switching state, such that the piston unit/cylinder unit is retracted, while this control signal is not generated in the open switching state. In the present embodiment, both buttons are open in the idle state. However, one button can also be opened in the idle state and the other button can be closed in the idle state, which may be accounted for when evaluating the control signals.

The control signals of the first and second contact pairs 9A and 9B are transmitted to the control and monitoring unit 15 independently of one another via a first signal transmission path 17 and a second signal transmission path 18. The control command is transmitted from the control and monitoring unit 15 to the actuator 16, for example the piston unit/cylinder unit of the scraper, via a further signal transmission path 19. The piston unit/cylinder unit can comprise a hydraulic unit having electrical switching valves, which receives the control signal.

Furthermore, the controller has a display and/or signal unit 20 and an input unit 27, which in the present embodiment have a touch-sensitive screen 20A (touch screen). The display and/or signal unit 20 communicates with the control and monitoring unit 15 via a further signal transmission path 21.

Figure 3:
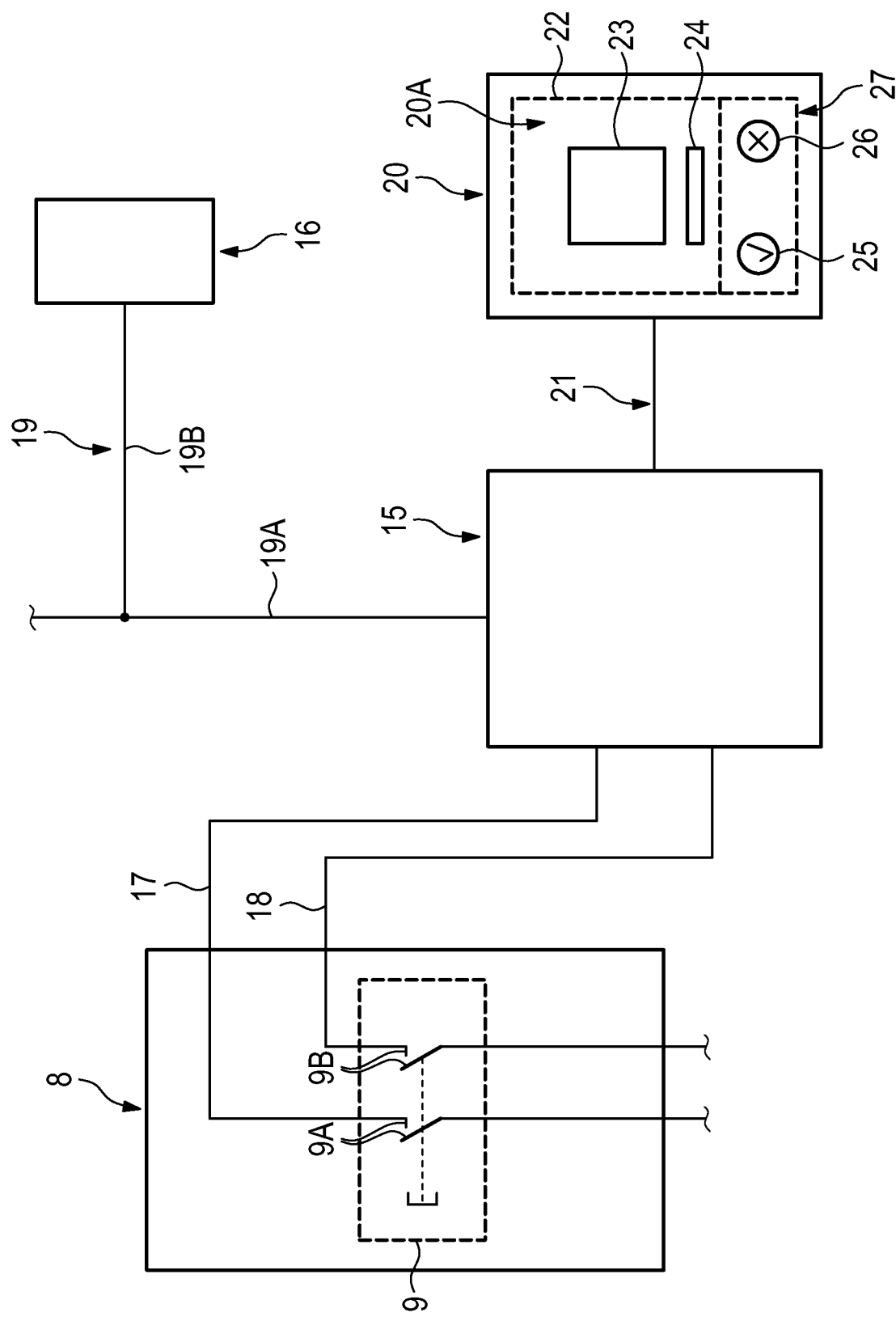
FIG. 3 is a block diagram having the components of a first embodiment of the device for controlling the construction machine which are relevant to the invention.

FIG. 3 shows an embodiment in which the signal transmission paths 17, 18 are electrical lines which are connected to the digital signal inputs of the control and monitoring unit 15. The signal transmission path 19 is a bus line of a bus system, which in the present embodiment is a CAN bus which operates according to a known communication protocol which already provides security functions, for example the formation of test values, for the data transmission. The 2-wire bus line includes a main line 19A and a stub 19B.

The control and monitoring unit 15 is configured such that the following method steps are carried out.

During operation of the construction machine, the control and monitoring unit 15 receives the control signals which are transmitted via the first and second signal transmission paths 17 and 18. For the sake of simplicity, it is assumed that a control signal "High" indicates the closed switching state and a control signal "Low" indicates the open switching state of the operating element (button) 9, i.e. if the signal "High" is present, the piston unit/cylinder unit of the scraper is retracted.

The control and monitoring unit 15 carries out a plausibility check of the control signals transmitted via the first and second signal transmission paths 17 and 18. Different plausibility criteria can be used for this. In the present embodiment, the plausibility criterion is that the signals transmitted via the first or second signal transmission path 17 and 18 are the same, for example both signals are "High" or "Low". Otherwise, a faulty state is assumed.

If the plausibility criterion is not met, the control and monitoring unit 15 causes the display and/or signal unit 20 to display a faulty state. A window 22 appears on the touch screen 20A, in which a graphical representation 23, for example an exclamation mark as a request to activate an emergency operation, and/or text 24 with a corresponding remark, for example "Activation of emergency operation", is/are visible.

If an incorrect state is assumed, the two signal transmission paths 17 and 18 are checked by the control and monitoring unit 15. First, the control and monitoring unit 15 deactivates the first signal transmission path 17, the second signal transmission path 18 remaining activated. The control and monitoring unit 15 then causes the display and/or signal unit 20 on the touch screen 20A to open a window 22 in which a graphical representation 23, for example a representation of the relevant operating element 9 of the operating panel 8, as a request to actuate the operating element 9, and/or text 24 with a corresponding remark, for example "Please actuate the operating element! (Path 1 is deactivated)," is/are visible. Two buttons 25, 26 appear in the window with which the correct (yes) or incorrect (no) functioning of the relevant component, for example the scraper, can be confirmed.

It is assumed that the scraper is raised by the piston unit/cylinder unit after actuation of the operating element 9. The user then touches the button 25 (yes) of the input unit 27, such that a control signal is generated that signals the correct functioning of the component actuated by the actuator 16 to the control and monitoring unit 15.

If the user touches the button 25 (yes), i.e. confirms the functionality of the component in question, so that the control and monitoring unit 15 receives the control signal for the correct state, the control and monitoring unit 15 switches to emergency operation. A graphical representation 23 and/or a text 24 appear(s) that the emergency operation is activated, for example "Emergency mode activated (correct short-term errors)".

If the scraper is not raised by the piston unit/cylinder unit after actuation of the operating element 9, the user touches the button 26 (*no*) of the input unit 27, so that a control signal is generated that signals the incorrect functioning of the component to the control and monitoring unit 15. If the user touches the button 26 (*no*), i.e. the functionality of the component in question is not confirmed, and the control and monitoring unit 15 receives the control signal for the incorrect state, the control and monitoring unit 15 deactivates the second signal transmission path 18 and activates the first signal transmission path 17. The control and monitoring unit 15 then causes the display and/or signal unit 20 on the touch screen 20A to reopen a window 22 in which a graphical representation 23, for example a representation of the relevant operating element 9 of the operating panel 8, as a new request to actuate the operating element 9, and/or text 24 with a corresponding remark, for example "Please actuate operating element! (Path 2 is deactivated)," is/are visible. In the window 22, two buttons 25, 26 reappear, with which the correct (yes) or incorrect functioning (no) of the relevant component, for example the scraper, can be confirmed.

If the user confirms the functionality of the relevant component, for example the scraper, after actuating the operating element 9, the control and monitoring unit 15 switches to emergency operation. A graphical representation 23 and/or a text 24 appear(s) that the emergency operation is activated, for example "Emergency mode activated (correct short-term errors)".

If the user cannot confirm the functionality of the relevant component, for example the scraper, and touches the button 26 (*no*), the control and monitoring unit 15 does not switch to emergency operation. A window 22 appears on the touch screen 20A, in which a corresponding graphical representation 23 and/or a corresponding text 24 is visible, for example "FAULT (emergency operation not possible) Service".

In the event of a fault, the control and monitoring unit 15 can intervene in the machine control, for example stop the further operation of the machine or only the operation of the relevant component for safety reasons.

Figure 4:
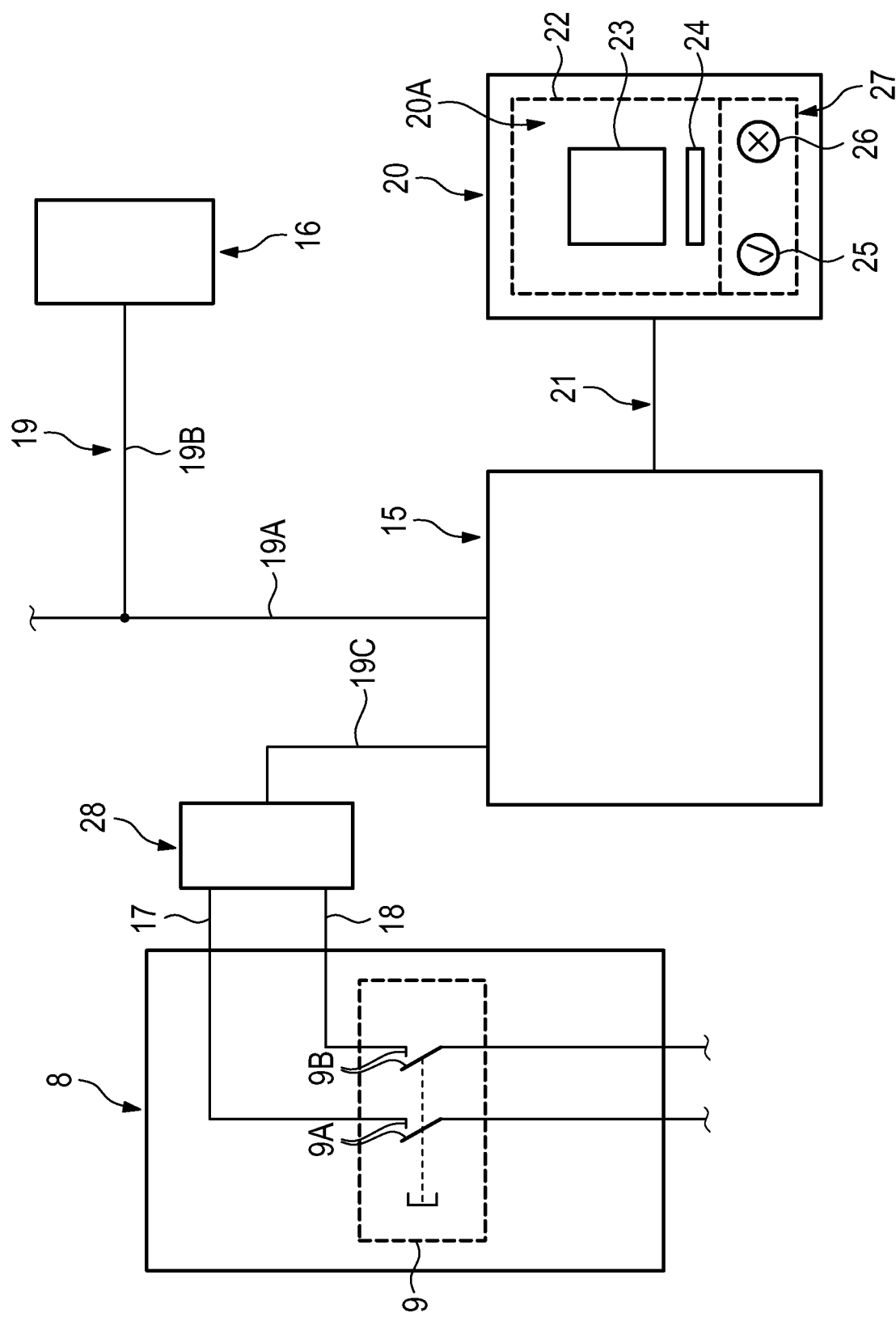
FIG. 4 is a block diagram of a second embodiment of the device for controlling the construction machine.

FIG. 4 shows an embodiment which differs from the embodiment described with reference to FIG. 3 in that a CAN communication module 28 (CAN node) is provided. The corresponding parts are provided with the same reference signs. The CAN communication module 28 can have a large number of inputs, of which only two are shown for the operating element 9. The first and second signal transmission paths 17, 18 connect the first and second contact pairs 9A and 9B to the inputs of the CAN communication module 28, which converts the control signal into a CAN bus signal that the control and monitoring unit 15 (PLC) receives. The output of the CAN communication module 28 is connected to the CAN bus input of the control and monitoring unit 15 (PLC) via a CAN bus line 19C. In this embodiment, redundancy is only created for the signal transmission from the button 9 to the CAN communication module 28.

Figure 5:
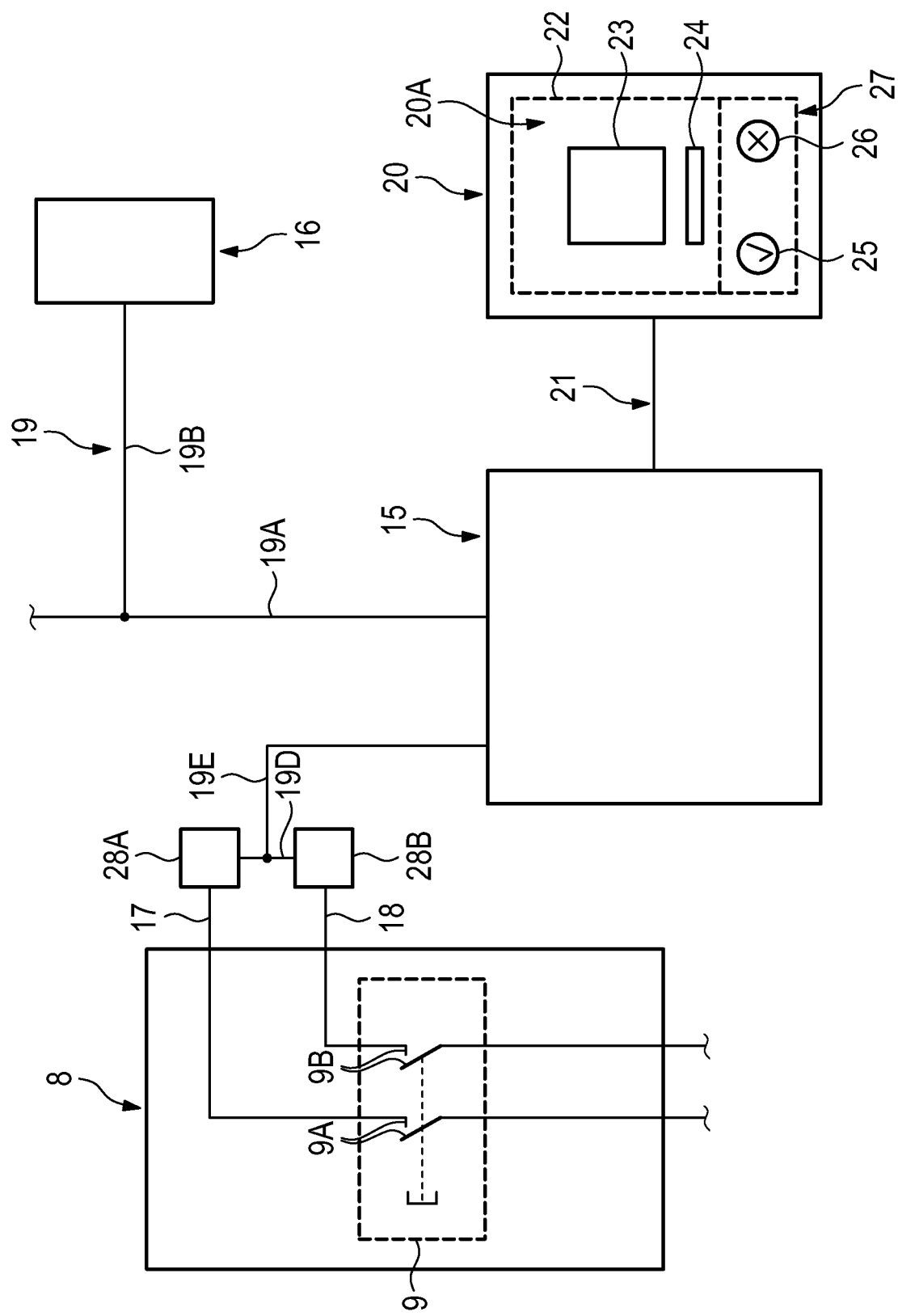
FIG. 5 is a block diagram of a third embodiment of the device for controlling the construction machine.

FIG. 5 shows a further embodiment, which differs from the embodiment described with reference to FIG. 4 in that two CAN communication modules 28A and 28B (CAN nodes) are provided. The corresponding parts are again provided with the same reference numerals. The first signal transmission path 17 is used for signal transmission from the first contact pair 9A to the first CAN communication module 28A and the second signal transmission path 18 is used for signal transmission from the second contact pair 9B to the second CAN communication module 28A. The outputs of the two CAN communication modules 28A and 28B are connected to one another via a CAN bus line 19D, to which a further CAN bus line 19E is connected, which leads to the CAN bus input of the control and monitoring unit 15 (PLC). Emergency operation is also possible if one of the two CAN communication modules 28A and 28B fails.

Figure 6:
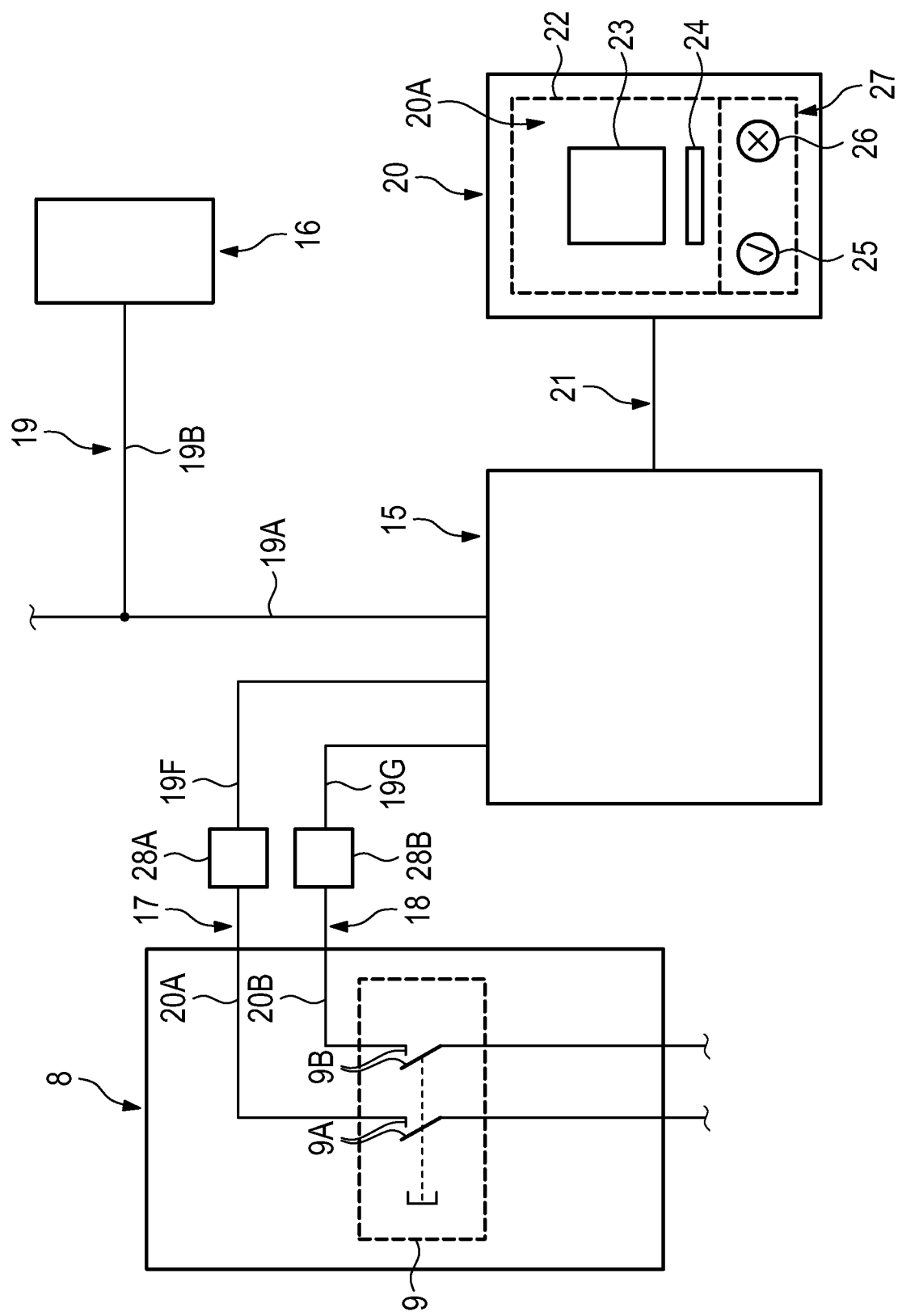
FIG. 6 is a block diagram of a fourth embodiment of the device for controlling the construction machine.

FIG. 6 shows a further embodiment, which differs from the embodiment described with reference to FIG. 5 in that a separate CAN bus line is provided for each CAN communication module 28A and 28B. The corresponding parts are again provided with the same reference numerals. The first signal transmission path 17 comprises the signal line 20A and the bus line 19F of the CAN bus, while the second signal transmission path 18 comprises the signal line 20B and the bus line 19G of the CAN bus. In this embodiment, redundancy for the signal transmission from the button 9 to the control and monitoring unit 15 (PLC) is created. Emergency operation is also possible if one of the two CAN bus lines 19F and 19G fails.

What is claimed is:

1. A construction machine, comprising:
a machine frame supported by a chassis;
an operating panel comprising at least one operating element, each operating element of the at least one operating element configured to selectively assume a plurality of switching states or positions;
a control and monitoring unit configured to control a component of the construction machine as a function of a control signal signaling a switching state or position of an associated operating element;
wherein, for each operating element of the at least one operating element, a first signal transmission path for signal transmission of a first control signal signaling the switching state or the position of the operating element and a second signal transmission path for signal transmission of a second control signal signaling the switching state or the position of the operating element are provided between the operating element and the control and monitoring unit, and
the control and monitoring unit is further configured to check the first control signal transmitted via the first signal transmission path and the second control signal transmitted via the second signal transmission path for the existence of a plausibility criterion, and if the control signals transmitted via the first and second signal transmission path do not meet the plausibility criterion, to cause issuance of a request to activate an emergency operation; and
wherein the construction machine further comprises an input unit cooperating with the control and monitoring unit, and configured to enable confirmation of
a correct functioning of a component of the construction machine, wherein a control signal signaling the correct functioning of the component is generated to the control and monitoring unit, and
an incorrect functioning of the component, wherein a control signal signaling the incorrect functioning of the component is generated to the control and monitoring unit.

2. The construction machine of claim 1, wherein the control and monitoring unit is configured such that:
if the control signals transmitted via the first and second signal transmission paths do not meet the plausibility criterion, the control is switched to an operating state in which the second signal transmission path is deactivated, so that the control of the component takes place only as a function of the first control signal transmitted via the first signal transmission path, and the control and monitoring unit causes the issuance of a request to actuate the operating element.

3. The construction machine of claim 2, wherein the control and monitoring unit is configured such that:
if the control and monitoring unit receives the control signal signaling the correct functioning of the component after actuation of the operating element, the control is switched to an emergency operation in which the control of the component takes place only as a function of the first control signal transmitted via the first signal transmission path.

4. The construction machine of claim 3, wherein:
the control and monitoring unit is configured such that, if the control and monitoring unit receives the control signal signaling the incorrect functioning of the component in an operating state in which the second signal transmission path is deactivated, the control is not switched to the emergency operation.

5. The construction machine of claim 4, wherein:
the control and monitoring unit is configured to cause one or more of display of a fault and signaling of a fault if the control is not switched to an emergency operation.

6. The construction machine of claim 1, wherein the control and monitoring unit is configured such that:
in the event that the control and monitoring unit receives the control signal signaling the incorrect functioning of the component after actuation of the operating element, the control is switched to an operating state in which the first signal transmission path is deactivated, so that the control of the component takes place only as a function of the second control signal transmitted via the second signal transmission path, and the control and monitoring unit causes issuance of a request for actuation of the operating element.

7. The construction machine of claim 1, wherein the control and monitoring unit is configured such that:
if the control and monitoring unit receives the control signal signaling the correct functioning after renewed actuation of the operating element, the control is switched to an emergency operation in which the control of the component takes place only as a function of the second control signal transmitted via the second signal transmission path.

8. The construction machine of claim 7, wherein:
the control and monitoring unit is configured such that, if the control and monitoring unit receives the control signal signaling the incorrect functioning of the component in an operating state in which the first signal transmission path is deactivated, the control is not switched to the emergency operation.

9. The construction machine of claim 8, wherein:
the control and monitoring unit is configured to cause one or more of display of a fault and signaling of a fault if the control is not switched to the emergency operation.

10. The construction machine of claim 1, wherein:
the input unit comprises a touch-sensitive screen having a graphical user interface.

11. The construction machine of claim 1, wherein:
the at least one operating element of the operating panel is a switch or button which has a first contact pair and a second contact pair, each of which assume an open or closed switching state, the first contact pair being switched into the first signal transmission path and the second contact pair being switched into the second signal transmission path.

12. The construction machine of claim 1, wherein:
the first and second signal transmission paths are bus lines of a CAN bus system.

13. The construction machine of claim 1, further comprising:
a touch-sensitive screen having a graphical user interface, and configured in cooperation with the control and monitoring unit to issue the request to activate an emergency operation.

14. The construction machine of claim 13, further comprising:
at least one actuator configured to actuate an associated component of the construction machine, responsive to control commands from the control and monitoring unit.

15. The construction machine of claim 14, wherein:
the at least one actuator is a piston/cylinder arrangement.

16. A method for controlling a construction machine, comprising:
transmitting a first control signal signaling the switching state or the position of an operating element via a first signal transmission path;
transmitting a second control signal signaling the switching state or the position of an operating element via a second signal transmission path;
checking the first control signal transmitted via the first signal transmission path and the second control signal transmitted via the second signal transmission path for the existence of a plausibility criterion; and
if the control signals transmitted via the first and second signal transmission path do not meet the plausibility criterion, prompting issuance of a request to activate an emergency operations;

wherein if the plausibility criterion is not met,
the signal transmission via the second signal transmission path is deactivated and control of a component of the construction machine takes place only as a function of the first control signal signaling the switching state or the position of the operating element, and
a request is generated for confirmation via an input unit of a correct functioning or an incorrect functioning of the component of the construction machine.

17. The method of claim 16, wherein:
if a correct functioning of the component of the construction machine is confirmed via the input unit, the control is switched to an emergency operation in which the control of the component takes place only as a function of the first control signal transmitted via the first signal transmission path.

18. The method of claim 16, further comprising:
causing displaying and/or signaling of a fault when an incorrect functioning of the component is confirmed via the input unit in an operating state in which the second signal transmission path is deactivated.

19. The method of claim 16, wherein:
if an incorrect functioning of the component of the construction machine is confirmed via an input unit,
the control is switched to an operating state in which the first signal transmission path is deactivated and the control of the component is carried out only via the second control signal signaling the switching state or the position of the operating element, and
a further request is generated for confirmation of a correct functioning or an incorrect functioning of the component of the construction machine.

20. The method of claim 16, wherein:
if a correct functioning of the component is confirmed via the input unit, the control is switched to an emergency operation in which the control of the component takes place only as a function of the second control signal transmitted via the second signal transmission path.

21. The method of claim 16, further comprising:
causing displaying and/or signaling of a fault when an incorrect functioning of the component is confirmed via the input unit in the operating state in which the first signal transmission path is deactivated.

22. The method of claim 16, wherein:
the input unit comprises a touch-sensitive screen with a graphical user interface.

23. The method of claim 16, wherein:
a switch or button is provided as the operating element, and the switch or button has a first contact pair and a second contact pair, each of which can be in an open or a closed switching state, the first contact pair being switched into the first signal transmission path and the second contact pair being switched into the second signal transmission path.

24. The method of claim 16, wherein:
wherein the issuance of a request to activate an emergency operation is prompted via a touch-sensitive screen with a graphical user interface.

25. The method of claim 16, wherein:
an actuator is actuated as a function of the control signal, which actuates a component of the construction machine.

* * * * *